United States Patent
Ninomiya et al.

(10) Patent No.: US 6,598,102 B1
(45) Date of Patent: Jul. 22, 2003

(54) SERIAL SIGNAL TRANSMISSION APPARATUS

(75) Inventors: Ryoji Ninomiya, Tachikawa (JP); Nobutaka Nakamura, Hidaka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 439 days.

(21) Appl. No.: 09/605,992

(22) Filed: Jun. 29, 2000

(30) Foreign Application Priority Data

Jun. 30, 1999 (JP) .......................................... 11-186330

(51) Int. Cl.⁷ .............................................. G06F 13/00
(52) U.S. Cl. ...................... 710/100; 710/305; 710/306; 710/303
(58) Field of Search ................................ 710/100, 300, 710/301, 302, 303, 304, 105, 106, 305, 306, 310, 313, 314

(56) References Cited

U.S. PATENT DOCUMENTS

| | | |
|---|---|---|
| 4,972,106 A | 11/1990 | Ruijs |
| 5,377,015 A | 12/1994 | Hatano et al. |
| 5,564,026 A * | 10/1996 | Amini et al. ............... 710/315 |
| 5,633,631 A | 5/1997 | Teckman |
| 5,751,975 A * | 5/1998 | Gillespie et al. ............ 710/315 |
| 6,040,709 A * | 3/2000 | Kishimoto ................... 326/59 |
| 6,425,033 B1 * | 7/2002 | Conway et al. ............. 710/107 |
| 6,457,091 B1 * | 9/2002 | Lange et al. ................ 710/314 |

FOREIGN PATENT DOCUMENTS

| | | | |
|---|---|---|---|
| DE | 3402257 A1 * | 8/1985 | ............ H03M/5/18 |
| EP | 0881778 | 12/1998 | |
| JP | 2-126771 | 5/1990 | |
| JP | 10-173640 | 6/1998 | |
| JP | 10-336036 | 12/1998 | |

* cited by examiner

*Primary Examiner*—Sumati Lefkowitz
*Assistant Examiner*—X. Chung-Trans
(74) *Attorney, Agent, or Firm*—Finnegan, Henderson, Farabow, Garrett & Dunner, L.L.P.

(57) ABSTRACT

In this invention, serial transmission suitable for signal lines in which a transformer is inserted is realized by using existing differential buffers. Differential output buffers are connected in parallel with each other. A differential signal line pair in which a transformer is inserted is driven by these two differential output buffers. In this case, a voltage between the two lines of the differential signal line pair is determined by a combination of outputs from the two differential output buffers, and three values, i.e., "+V", "−V", and "zero", can be output. By using this ternary data, serial signal transmission based on the bipolar transfer mode can be performed, and serial transmission suitable for the signal lines in which the transformer is inserted can be realized.

19 Claims, 4 Drawing Sheets

| OUT | IN1 | IN2 |
|---|---|---|
| +V | "1" | "1" |
| ZERO | "0" | "1" |
| −V | "0" | "0" |

| OUT | IN1 | IN2 |
|---|---|---|
| +V | "1" | "1" |
| ZERO | "1" | "0" |
| −V | "0" | "0" |

SERIAL SIGNAL TRANSMISSION APPARATUS

CROSS-REFERENCE TO RELATED APPLICATIONS

This application is based upon and claims the benefit of priority from the prior Japanese Patent Application No. 11-186330, filed Jun. 30, 1999, the entire contents of which are incorporated herein by reference.

BACKGROUND OF THE INVENTION

The present invention relates to a serial signal transmission apparatus for realizing a high-speed serial interface.

Recently, various portable, battery-driven, notebook type personal computers (to be referred to as notebook PCs hereinafter) have been developed. Some notebook PCs are designed to be attached to expansion units to expand the functions as needed. To allow a notebook PC body to effectively use the resources of an expansion unit, it is important to connect the bus of the notebook PC body to the bus in the expansion unit. With this bus connection, devices on the bus in the expansion unit can be handled in the same manner as devices in the notebook PC body.

In many personal computers, PCI (Peripheral Component Interface) buses are used. Bus connection between a notebook PC body and an expansion unit is generally performed by physically connecting PCI buses on the notebook PC body side and expansion unit side through docking connectors, each having many pins corresponding to the number of signal lines of each PCI bus, prepared on the notebook PC body side and expansion unit side.

According to this arrangement, however, a large area is required to mount a docking connector. This causes a disadvantage in attaining reductions in the size and profile of the notebook PC body. In addition, the connector mounting position on the notebook PC body side needs to match that on the expansion unit side. This imposes limitations on a physical housing structure in production development.

Under the circumstances, demands have arisen for development of a technique for transferring transactions between. PCI buses through a high-speed serial interface. With the use of a high-speed serial interface, a notebook PC body can be connected to an expansion unit through a thin, flexible serial cable.

As schemes of transmitting high-speed serial signals, two modes, i.e., a differential mode and a bipolar transfer mode, have attracted attention.

The differential mode is a scheme using a pair of signals whose phases are inverted from each other. In this scheme, binary serial data of "1" and "0" are transmitted as a phase-inverted signal pair.

The bipolar transfer mode is a scheme of transmitting binary serial data of "1" and "0" at three voltage levels, i.e., +V, 0, and −V. When data changes, the sign is inverted. When identical data is to be transmitted, a voltage level of 0 is output. In the bipolar transfer mode, if data transfer in the long term, the numbers of +V and −V signals become almost equal.

When a high-speed signal which is low in ability to recover and likely to cause an operation error in a case of data loss due to noise is to be transferred, a transformer as an antistatic means is preferably inserted in signal lines to separate DC components. In signal transfer using a transformer, the following two problems are posed, and hence care must be taken for design.

1) To prevent a transformer from being saturated, a current must be prevented from continuously flowing in one direction.

2) The total time in which a voltage is applied to the transformer in one direction is made almost equal to the total time in which a voltage is applied to the transformer in the other direction over a long-term span. If the total time in which a voltage is generated in one direction is more than that in the other direction, voltage waveforms generated on the secondary side shift in voltage level as a whole, although the voltage amplitude remains unchanged.

As a method of solving these two problems, transfer based on the bipolar transfer mode is an optimal scheme. In developing an LSI using this mode, a long development time is required because there is no library for LSIs only requiring a short delivery/development time, e.g., gate arrays and standard cells.

In the case of the differential mode, a library for LSIs such as gate arrays and standard cells has been prepared as standard, only a short development time is required. It is, however, difficult to solve the problems 1) and 2). As a countermeasure against these problems, the nBmB scheme, which increases the data length and encodes it for transmission is available. However, extra data for coding is added to the data, the transfer rate of the target data decreases.

BRIEF SUMMARY OF THE INVENTION

The present invention has been made in consideration of the above situation, and has as its object to provide a serial signal transmission apparatus which can realize serial transmission suitable for signal lines in which a transformer is inserted, by using existing differential buffers, and can perform serial transfer with sufficiently high reliability without decreasing a transfer rate.

In order to achieve the above object, according to the present invention, there is provided a serial signal transmission apparatus for transmitting serial data through a signal line pair in which a transformer is inserted. The serial signal transmission apparatus comprises a first differential output buffer whose positive and negative output terminals are respectively connected to two lines of the signal line pair, and a second differential output buffer whose positive and negative output terminals are respectively connected to the two lines of the signal line pair.

The signal line pair is driven by using the first and second differential output buffers to convert each binary data constituting serial data into ternary data including a first state in which a current flows in the transformer in a positive direction, a second state in which a current flows in the transformer in a negative direction, and a third state in which no current flows in the transformer, and the ternary data is output onto the signal line pair.

In this serial signal transmission apparatus, two differential output buffers are connected in parallel with each other, and a signal line pair is driven by these two differential output buffers. In this case, a voltage between the signal lines of the signal line pair is determined by a combination of outputs from the two differential output buffers. Ternary data can therefore be transmitted by using, for example, a state in which both the two differential output buffers output currents in the positive direction as the first state in which a current flows in the transformer in the positive direction, a state in which both the buffers output currents in the negative direction as the second state in which a current flows in the transformer in the negative direction, and a state in which one differential output buffer outputs a current in the positive direction, and the other differential output buffer outputs a current in the negative direction so that the output currents cancel out each other as the third state in which no current flows in the transformer. By using this ternary data, signal transmission based on the abovementioned bipolar transfer mode can be realized. This makes it possible to solve problems, e.g., magnetic saturation of the transformer and a shift in the offset level of a signal on the secondary side of the transformer.

On the receiving side as well, by connecting differential input buffers in parallel with each other, ternary data transferred by the bipolar transfer mode can be easily detected. In this case, it is preferable that the apparatus further comprise means for applying a predetermined bias voltage between the reference signal input terminals of the first and second differential input buffers and the signal line pair on the secondary side of the transformer so as to produce potential differences between the reference signal input terminals and the signal line pair on the secondary side of the transformer in the third state. This makes it possible to correctly detect the third state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the views of the accompanying drawing.

Figures 1, 2:
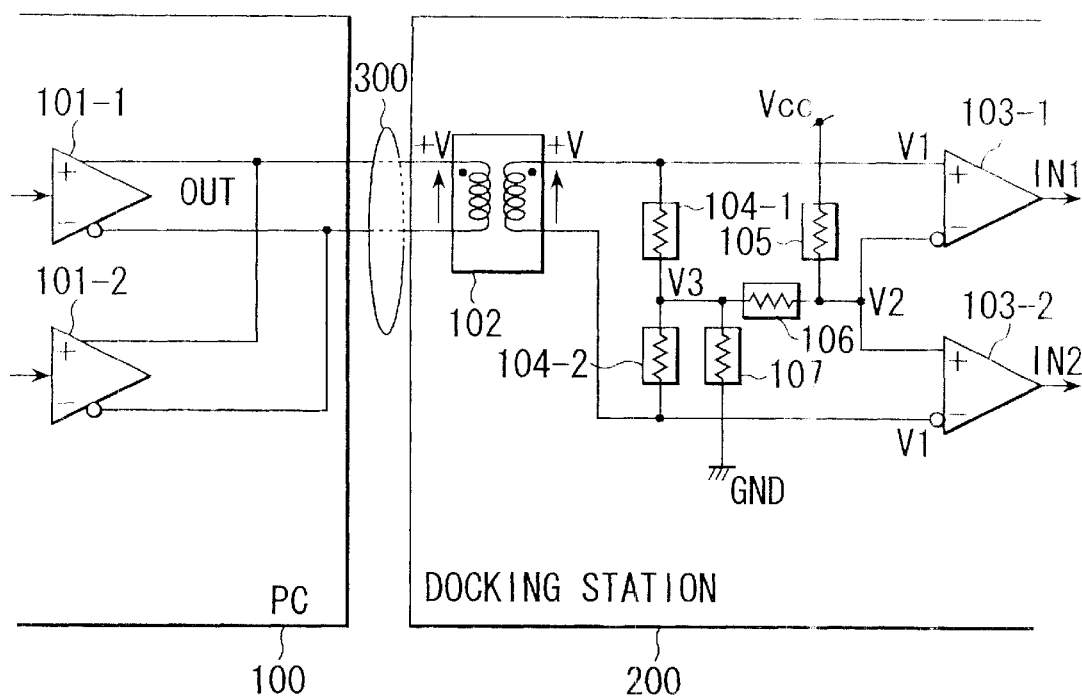
FIG. 1 is a circuit diagram showing the arrangement of a serial signal transmission apparatus according to an embodiment of the present invention.
FIG. 2 is a view for explaining the relationship between input and output values in the serial signal transmission apparatus of this embodiment.

FIG. 1 shows the arrangement of a serial signal transmission apparatus according to an embodiment of the present invention. This serial signal transmission apparatus transmits serial data through a signal line pair in which a transformer is inserted. An arrangement in which a PC (Personal Computer) body 100 is connected to an expansion unit 200 through a serial transmission path 300 formed from a cable will be described.

The serial transmission path 300 is formed from a differential signal line pair, in which a transformer (pulse transformer) 102 is inserted, as shown in FIG. 1. Since the serial transmission path 300 is formed from a cable, the transformer 102 is provided in a unit on the receiving side (docking station 200 in FIG. 1) in practice, as shown in FIG. 1.

Transmission Circuit Section

The transmission circuit section of the serial signal transmission apparatus comprises two differential output buffers 101-1 and 101-2, as shown in FIG. 1.

Each of the two differential output buffers 101-1 and 101-2 serves to drive the differential signal line pair with a constant current output, and outputs binary data by driving the differential signal line pair. Assume that this binary value is "1" or "0". In this case, if the value is "1", a current flows from the positive output terminal side to the negative output terminal side of the differential buffer. If the value is "0", a current flows from the negative output terminal side to the positive output terminal side. In this embodiment, these two differential output buffers 101-1 and 101-2 are connected in parallel with each other, as shown in FIG. 1. The positive output terminals of the differential output buffers 101-1 and 101-2 are connected to the positive line of the two lines constituting the differential signal line pair, whereas the negative output terminals of the differential output buffers 101-1 and 101-2 are connected to the negative line of the differential signal line pair.

In this embodiment, the differential signal line pair is driven with three values, i.e., +V, −V, and zero, by using combinations of outputs from the two differential output buffers 101-1 and 101-2. "+V" indicates a state wherein a positive-direction current, i.e., a downward current, flows in the transformer 102. "−V" indicates a state wherein a negative-direction current, i.e., an upward current, flows in the transformer 102. In addition, "zero" indicates a state wherein no current flows in the transformer 102.

When both the differential output buffers 101-1 and 101-2 are set in the "1"-output state wherein a positive-direction current is output, this state corresponds to "+V". When both the differential output buffers 101-1 and 101-2 are set in the "0"-output state wherein a negative-direction current is output, this state corresponds to "−V". When one of the differential output buffers 101-1 and 101-2 is set in the "1"-output state wherein a positive-direction current is output, and the other is set in the "0"-output state wherein a negative-direction current is output, this state corresponds to "zero". With this setting, serial data transmission can be performed with three values, i.e., +V, −V, and 0.

Driving control of the differential output buffers 101-1 and 101-2 is performed as follows.

1) When Voltage to Be Applied to Transform 102 Is Set to 0: "Zero"-output State:

The differential output buffer 101-1 outputs "1", and the differential output buffer 101-2 outputs "0". In this case, a current flows from the positive output terminal of the differential output buffer 101-1 to the positive output terminal of the differential output buffer 101-2, and a current flows from the negative output terminal of the differential output buffer 101-2 to the negative output terminal of the differential output buffer 101-1. For this reason, no current flows in the transformer 102, and hence no voltage is generated between the primary terminals of the transformer 102. This state wherein the outputs current from the differential output buffers 101-1 and 101-2 cancel out each other corresponds to "zero".

2) When Voltage to Be Applied to Transform 102 Is Set to +V: "+V"-output State:

Both the differential output buffers 101-1 and 101-2 output "1". At this time, since a current obtained by superimposing output currents from the two differential output buffers 101-1 and 101-2 is passed to the transformer 102, a downward current flows in the transformer 102, and the voltage +V is applied to the primary side of the transformer 102. Since the turn ratio of the transformer 102 is 1:1, the voltage +V is also applied to the secondary side of the transformer 102.

3) When Voltage to Be Applied to Transform 102 Is Set to −V: "−V"-output State:

Both the differential output buffers 101-1 and 101-2 output "0". At this time, since a current obtained by superimposing output currents from the two differential output buffers 101-1 and 101-2 is passed to the transformer 102, an upward current flows in the transformer 102, and the voltage −V is applied to the primary side of the transformer 102. Since the turn ratio of the transformer 102 is 1:1, the voltage −V is also applied to the secondary side of the transformer 102.

Reception Circuit Section

A reception circuit section comprises two differential input buffers 103-1 and 103-2 and resistors 104-1, 104-2, and 105 to 107, as shown in FIG. 1.

Each of the two differential input buffers 103-1 and 103-2 has positive and negative input terminals, and outputs "1" when the potential of the positive input terminal is higher than that of the negative input terminal, and outputs "0" when the potential of the positive input terminal is lower than that of the negative input terminal. One of the positive and negative input terminals serves as a signal input terminal for receiving a signal to be detected, and the other input terminal serves as a reference signal input terminal for receiving a signal as a reference for comparison.

The positive input terminal of the differential input buffer 103-1 is connected to the positive line of the differential signal line pair on the secondary side of the transformer 102. Therefore, the positive input terminal serves as a signal input terminal, and the negative input terminal serves as a reference signal input terminal. The negative input terminal of the differential input buffer 103-2 is connected to the negative line of the differential signal line pair on the secondary side of the transformer 102. Therefore, the negative input terminal serves as a signal input terminal, and the positive input terminal serves as a reference signal input terminal.

The above three values, i.e., +V, −V, and 0, are detected with combinations of output signals from the two differential input buffers 103-1 and 103-2. FIG. 2 shows the relationship between outputs (OUT) from the differential output buffers and 101-1 and 101-2 and values (IN1, IN2) detected by the differential input buffers 103-1 and 103-2. OUT indicates an electrical state, and IN1 and IN2 represent logical values.

As shown in FIG. 2, if OUT is +V, both the differential input buffers 103-1 and 103-2 output "1" (IN1, IN2="1"). If OUT is −V, both the differential input buffers 103-1 and 103-2 output "0" (IN1, IN2="0"). If OUT is zero, the differential input buffer 103-1 outputs "0", and the differential input buffer 103-2 outputs "1" (IN1="0", IN2="1").

The resistors 104-1 and 104-2 on the receiving side in FIG. 1 are terminating resistors for eliminating signal reflection. The resistors 105 to 107 constitute a bias circuit for applying a predetermined bias voltage between the differential signal line pair and the reference signal input terminals of the differential input buffers 103-1 and 103-2. That is, as shown in FIG. 1, one terminal of the resistor 106 is connected to the common reference signal input terminal of the differential input buffers 103-1 and 103-2, and the other terminal is connected to the series node of the resistors 104-1 and 104-2. In addition, the resistor 105 is connected between one terminal of the resistor 106 and a positive power supply terminal. The resistor 107 is connected between the other terminal of the resistor 106 and a ground terminal. The resistors 104-1 and 104-2 have the same resistance value. In the "zero"-output state, therefore, a potential generated at the other terminal of the resistor 106 is applied to the differential signal line pair through the resistors 104-1 and 104-2.

With this arrangement, in the "zero"-output state as well, the differential signal line pair can be prevented from being set in a floating state, and predetermined potential differences can be produced between the signal input terminals and reference signal input terminals of the differential input buffers 103-1 and 103-2, respectively. This makes it possible to detect the "zero"-output state more reliably.

Serial Transfer Operation

The operation of this serial signal transmission apparatus will be described.

(1) "Zero"-output State

When the voltage applied to the transformer 102 is to be set to zero, the differential output buffers 101-1 and 101-2 respectively output "1" and "0". In this case, no current flows in the transformer 102, and a zero voltage is applied to the transformer 102. Owing to the function of the resistors 105 to 107, however, a specific offset voltage (V1 in this case) is generated on the positive and negative lines of the differential signal line pair on the secondary side of the transformer 102. At this time, it is ensured that a potential V2 of the negative input terminal of the differential input buffer 103-1 and the positive input terminal of the differential input buffer 103-2 becomes higher than the potential V1 owing to the function of the resistor 106. As a result, the differential input buffers 103-1 and 103-2 respectively detect "0" and "1".

(2) "+V"-output State

When the voltage applied to the transformer 102 is to be set to +V, both the differential output buffers 101-1 and 101-2 output "1". With this operation, the voltage +V is applied to both the primary and secondary sides of the transformer 102. This voltage +V is divided into two voltages by the resistors 104-1 and 104-2. If, therefore, the potential at the node of the resistors 104-1 and 104-2 is represented by V3, the potential at the positive line of the differential signal line pair on the secondary side of the transformer 102 is given by $$V3 + \tfrac{1}{2} V$$

and, the potential at the negative line is given by $$V3 - \tfrac{1}{2} V$$

If resistance values are respectively selected for the resistors 105 to 107 such that the potential V2 at the reference signal input terminals of the differential input buffers 103-1 and 103-2 is set between V3+½ V and V3−½ V, both the differential input buffers 103-1 and 103-2 detect "1".
(3) "−V"-output State
When the voltage applied to the transformer 102 is to be set to −V, both the differential output buffers 101-1 and 101-2 output "0". With this operation, the voltage −V is applied to both the primary and secondary sides of the transformer 102. This voltage −V is divided into two voltages by the resistors 104-1 and 104-2. If, therefore, the potential at the node of the resistors 104-1 and 104-2 is represented by V3, the potential at the positive line of the differential signal line pair on the secondary side of the transformer 102 is given by $$V3-½\ V$$

and, the potential of the negative line is given by $$V3+½\ V$$

If resistance values are respectively selected for the resistors 105 to 107 such that the potential V2 at the reference signal input terminals of the differential input buffers 103-1 and 103-2 is set between V3+½ V and V3−½ V, both the differential input buffers 103-1 and 103-2 detect "0".

Figure 3:
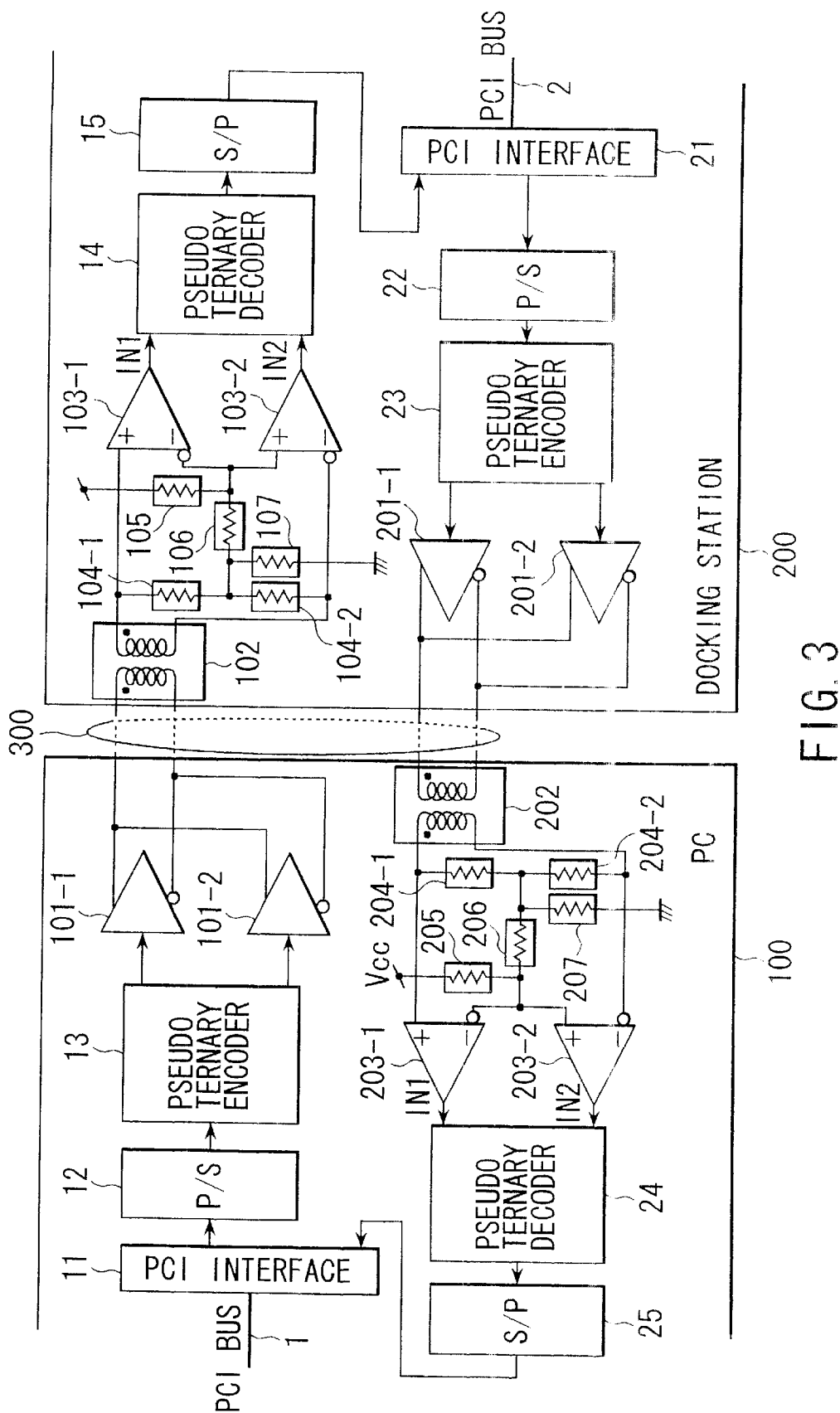
FIG. 3 is a block diagram showing the arrangement of a PCI serial interface using the serial signal transmission apparatus according to this embodiment.

As described above, according to the serial signal transmission apparatus of this embodiment, since existing differential buffers can be used, LSIs requiring only a short development time, e.g., gate arrays and standard cells, can be used. In addition, ternary data can be transferred by using differential buffers. This makes it possible to realize serial transfer based on the bipolar transfer mode, which is suitable for high-speed bit serial transfer using a transformer.
Serial Connection Between PCI Buses A practical arrangement for serial connection between two PCI buses 1 and 2 using the serial signal transmission apparatus in FIG. 1 will be described with reference to FIG. 3.

A serial transmission path 300 for connecting the PC body 100 to the docking station 200 includes a downward differential signal line pair for performing serial signal transfer from the PC body 100 to the docking station 200 and an upward differential signal line pair for performing serial signal transfer from the docking station 200 to the PC body 100. These differential signal line pairs constitute a full duplex channel as a whole.

A PCI interface 11 on the PC body 100 side exchanges transactions with various PCI devices connected to the PCI bus 1 of the PC body 100. Likewise, a PCI interface 21 on the docking station 200 side exchanges transactions with various expansion PCI devices on the PCI bus 2 of the docking station 200.

Serial transfer through the downward differential signal line pair in the following manner transfers a transaction from a device on the PCI bus 1 to a device on the PCI bus 2.

In this downward serial transfer, first of all, information such as an address, command, data (only in write operation), and byte enable information constituting a transaction to be transferred is converted from parallel data to serial data by a parallel/serial conversion circuit 12. This serial data is passed to a pseudo ternary encoder 13. The pseudo ternary encoder 13 is a modulation circuit for converting binary data of "1" and "0" constituting the serial data into three values, i.e., +V, −V, and zero.

More specifically, every time binary data change in value, +V and −V are alternately output. When binary data with the same value continue, zero is output. In the "+V"-output state, "1"-level signals are respectively input to the differential output buffers 101-1 and 101-2. In the "−V"-output state, "0"-level signals are respectively input to the differential output buffers 101-1 and 101-2. In the "zero"-output state, a "1"-level signal is input to one of the differential output buffers 101-1 and 101-2, and a "0"-level signal is input to the other differential output buffer. With this operation, serial signal transfer based on the above bipolar transfer mode is executed, and the three values, i.e., +V, −V, and zero, are transferred to the differential input buffers 103-1 and 103-2 of the docking station 200 through the transformer 102.

On the docking station 200 side, the differential input buffers 103-1 and 103-2 detect the three values, i.e., +V, −V, and zero. The signals IN1 and IN2 from the differential input buffers 103-1 and 103-2 are passed to a pseudo ternary decoder 14. The signals IN1 and IN2 are decoded back to binary data by the pseudo ternary decoder 14. A decoding method is determined in accordance with the encoding method used by the pseudo ternary encoder 13. The serial data converted back to the binary data is converted into parallel data by a serial/parallel conversion circuit 15. This data is then passed to the PCI interface section 21. The PCI interface section 21 passes the transaction to the PCI bus 2.

A transaction is transferred from a device on the PCI bus 2 to a device on the PCI bus 1 by serial transfer through an upward differential signal line pair in the following manner.

In this upward serial transfer, first of all, information such as an address, command, data (only in write operation), and byte enable information constituting a transaction to be transferred or information responding to a transaction from the device on the PCI bus 1 is converted from parallel data to serial data by a parallel/serial conversion circuit 22. This serial data is passed to a pseudo ternary encoder 23. The pseudo ternary encoder 23 performs control to convert binary data of "1" and "0" constituting the serial data into three values, i.e., +V, −V, and zero. With this operation, differential output buffers 201-1 and 201-2 execute serial signal transfer based on the abovementioned bipolar transfer mode to transfer the three values, i.e., +V, −V, and zero, to differential input buffers 203-1 and 203-2 of the PC body 100 through a transformer 202. Terminating resistors 204-1 and 204-2 and resistors 205 to 207 constituting a bias circuit are arranged between the transformer 202 and the differential input buffers 203-1 and 203-2. This arrangement makes it possible to correctly detect the three values, i.e., +V, −V, and zero.

Figure 4:
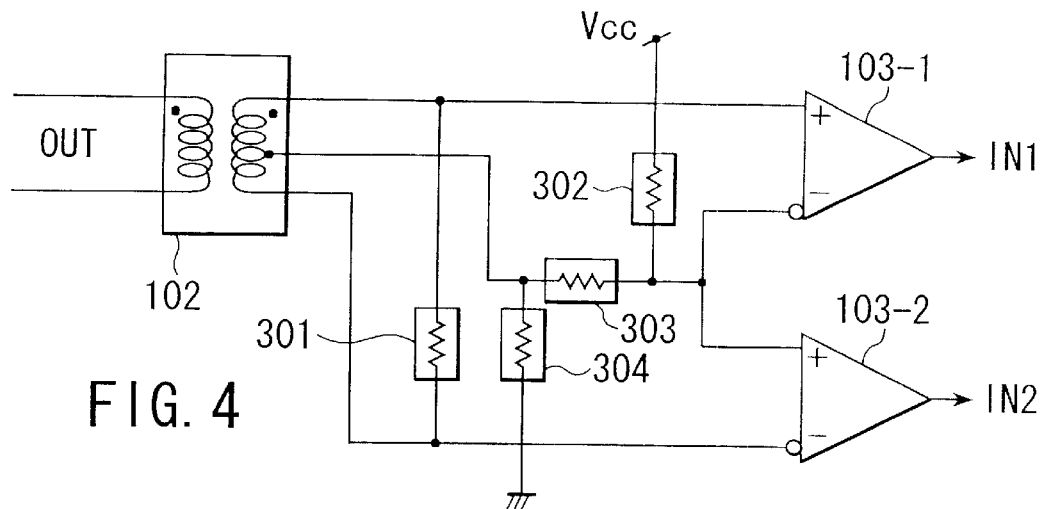
FIG. 4 is a circuit diagram showing the second example of the arrangement of a reception circuit section of the serial signal transmission apparatus according to this embodiment.

On the PC body 100 side, the differential input buffers 203-1 and 203-2 detect the three values, i.e., +V, −V, and zero, and the signals IN1 and IN2 from the differential input buffers 203-1 and 203-2 are passed to a pseudo ternary decoder 24. The signals IN1 and IN2 are decoded into binary data by the pseudo ternary decoder 24. The serial data converted back to the binary data is converted into parallel data by a serial/parallel conversion circuit 25. This data is then passed to the PCI interface section 11. The PCI interface section 11 passes the transaction to the PCI bus 1.
Second Example of Arrangement of Reception Circuit Section FIG. 4 shows the second example of the reception circuit section of the serial signal transmission apparatus according to this embodiment.

Assume that the transformer 102 with a center tap is used. A resistor 301 is a terminating resistor, which is connected between the positive and negative lines on the secondary side of the transformer 102, as shown in FIG. 4. Resistors 302 to 304 constitute a bias circuit for applying a predetermined bias voltage between the reference signal input terminals of the differential input buffers 103-1 and 103-2 and the differential signal line pair. As shown in FIG. 4, one terminal of the resistor 303 is connected to the common reference signal input terminal of the differential input buffers 103-1 and 103-2, and the other terminal of the resistor 303 is connected to the center tap of the transformer 102. The resistor 302 is connected between one terminal of the resistor 303 and a positive power supply terminal. The resistor 304 is connected between the other terminal of the resistor 303 and a ground terminal. The potential generated at the other terminal of the resistor 303 is applied to the differential signal line pair through the secondary winding.

With this arrangement, in the "0"-output state as well, the differential signal line pair can be prevented from being set in a floating state, and predetermined potential differences can be produced between the signal input terminals and reference signal input terminals of the differential input buffers 103-1 and 103-2, respectively, thereby detecting the "0"-output state more reliably.

Third Example of Arrangement of Reception Circuit Section

Figure 5:
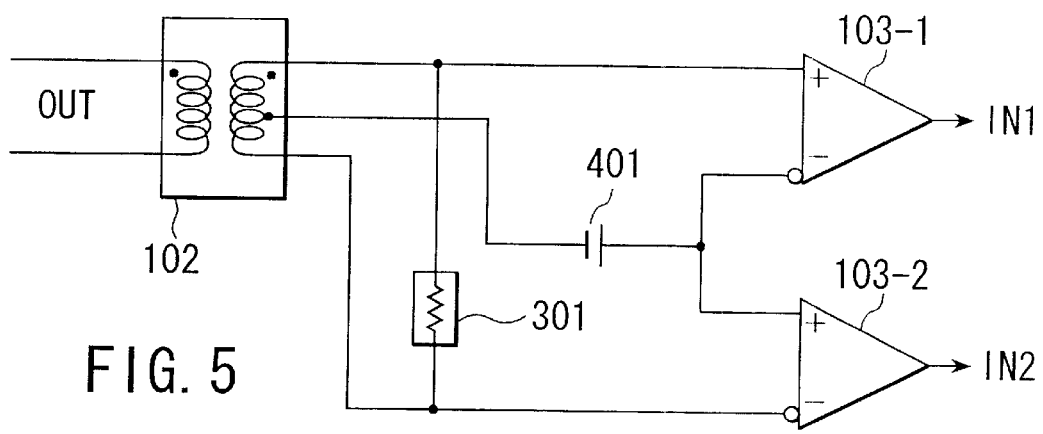
FIG. 5 is a circuit diagram showing the third example of the arrangement of a reception circuit section of the serial signal transmission apparatus according to this embodiment.

FIG. 5 shows the third example of the reception circuit section of the serial signal transmission apparatus according to this embodiment.

In this example, as shown in FIG. 5, one battery 401 is used in place of the resistors 302 to 304 in FIG. 4. The positive terminal of the battery 401 is connected to the common reference signal input terminal of the differential input buffers 103-1 and 103-2, and the negative terminal of the battery 401 is connected to the center tap of the transformer 102. With this arrangement as well, the same effects as those in FIG. 4 can be obtained.

Figure 6:
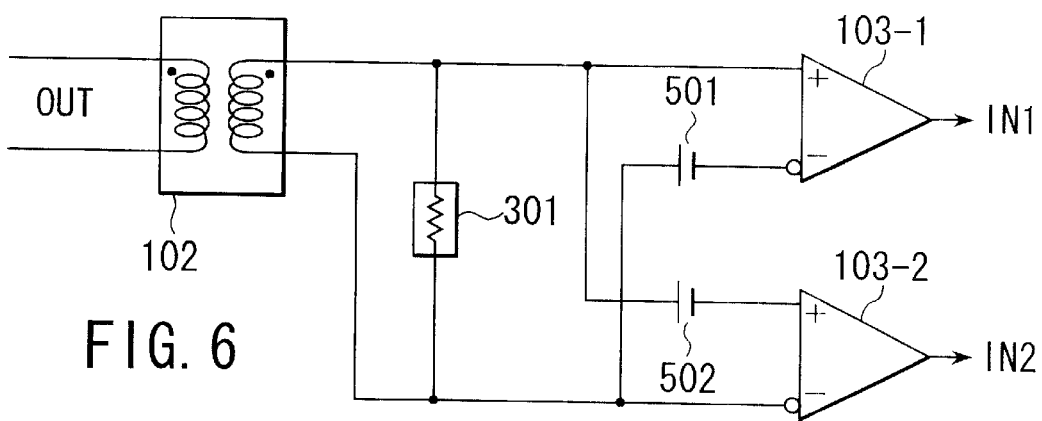
FIG. 6 is a circuit diagram showing the fourth example of the arrangement of a reception circuit section of the serial signal transmission apparatus according to this embodiment.

Fourth Example of Arrangement of Reception Circuit Section of Serial Signal Transmission Apparatus FIG. 6 shows the fourth example of the reception circuit section of the serial signal transmission apparatus according to this embodiment.

A resistor 301 serves as a terminating resistor as in the example shown in FIGS. 4 and 5, which is connected between the positive and negative lines of the differential signal line pair on the secondary side of the transformer 102, as shown in FIG. 6. A battery 501 serves as a bias circuit for applying a predetermined bias voltage between the reference signal input terminal of the differential input buffer 103-1 and the negative line of the differential signal line pair. A battery 502 serves as a bias circuit for applying a predetermined bias voltage between the reference signal input terminal of the differential input buffer 103-2 and the positive line of the differential signal line pair. By selecting appropriate values as the bias voltages of the batteries 501 and 502, three values (OUT), i.e., +V, −V, and 0, and the values (IN1, IN2) detected by the differential input buffers 103-1 and 103-2 have the relationship shown in FIG. 8.

Note that the positive and negative terminals of each of the batteries 501 and 502 are switched, the same input/output relationship as that shown in FIG. 2 can be obtained.

Fifth Example of Arrangement of Reception Circuit Section

Figures 7, 8:
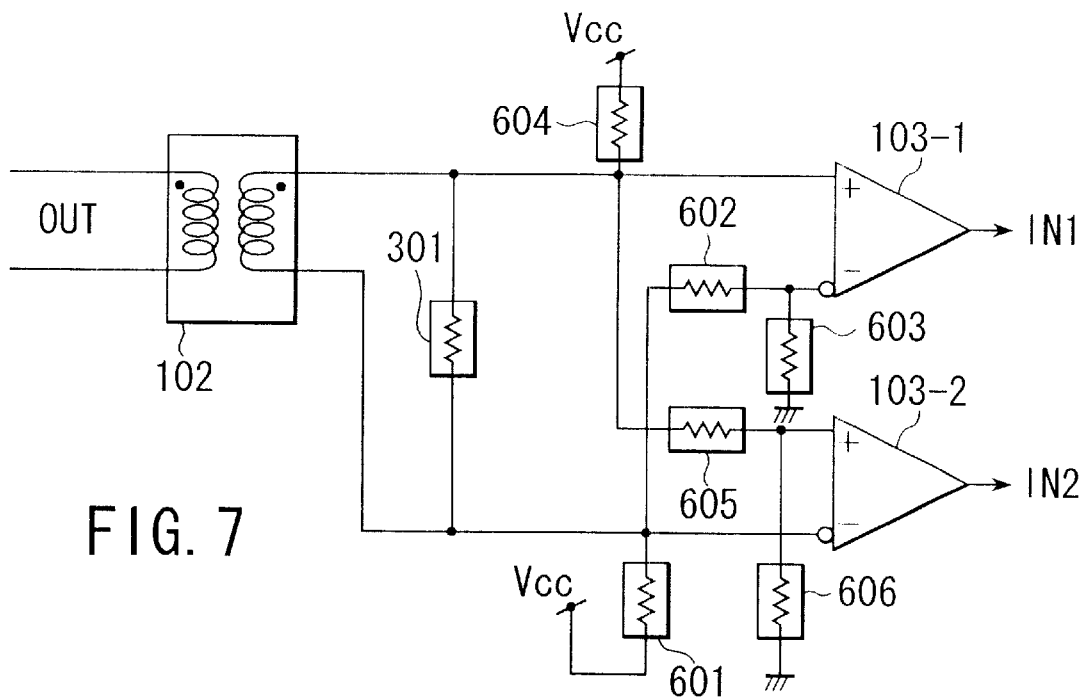
FIG. 7 is a circuit diagram showing the fifth example of the arrangement of a reception circuit section of the serial signal transmission apparatus according to this embodiment.
FIG. 8 is a view for explaining the relationship between input and output values when the reception circuit shown in FIG. 6 or 7 is used.

FIG. 7 shows the fifth example of the reception circuit section of the serial signal transmission apparatus according to this embodiment.

In this example, the batteries 501 and 502 in FIG. 6 are realized by resistor circuits. Resistors 601, 602, and 603 constitute the battery 501. Resistors 604, 605, and 606 constitute the battery 502.

As has been described above, according to the present invention, serial transmission suitable for a signal line path in which a transformer is inserted can be executed by using existing differential buffers. This makes it possible to perform serial transfer with sufficiently high reliability without decreasing the transfer rate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus for transmitting serial data through first and second signal lines in which a transformer is inserted, wherein first and second terminals on a primary side of the transformer are respectively connected to the first and second signal lines, comprising:

a first differential output buffer whose positive and negative output terminals are respectively connected to the first and second signal lines; and a second differential output buffer whose positive and negative output terminals are respectively connected to the first and second signal lines, wherein the first and second signal lines are driven by using said first and second differential output buffers to convert each binary data constituting serial data into ternary data including a first state in which a current flows in said transformer in a positive direction, a second state in which a current flows in said transformer in a negative direction, and a third state in which no current flows in said transformer, and the ternary data is output onto the signal line pair.

2. An apparatus according to claim 1, wherein said apparatus further comprises:

a first differential input buffer having a positive or negative signal input terminal and a reference signal input terminal, the positive or negative signal input terminal being connected to one of the first and second signal lines on a secondary side of said transformer; and a second differential input buffer having a positive or negative signal input terminal and a reference signal input terminal, the positive or negative signal input terminal being connected to the other of the first and second signal lines on the secondary side of said transformer, wherein a value of the ternary data transmitted through the first and second signal lines are detected by a combination of output signals from said first and second differential input buffers.

3. An apparatus according to claim 2, further comprising means for applying a predetermined bias voltage between the reference signal input terminals of said first and second differential input buffers and the first and second signal lines on the secondary side of said transformer so as to produce potential differences between the reference signal input terminals and the first and second signal lines on the secondary side of said transformer in the third state.

4. An electronic apparatus for connection between buses of computers, comprising:

a signal line pair including first and second signal lines in which a transformer is inserted, wherein first and second terminals on a primary side of the transformer are respectively connected to the first and second signal lines;

means for converting information required for transaction transfer between the buses from parallel data to serial data;

a first differential output buffer whose positive and negative output terminals are respectively connected to the first and second signal lines;

a second differential output buffer whose positive and negative output terminals are respectively connected to the first and second signal lines; and means for generating input signals to be respectively supplied to said first and second differential output buffers on the basis of each binary data constituting the serial data so as to transmit through the first and second signal lines ternary data including a first state in which a current flows in said transformer in a positive direction, a second state in which a current flows in said transformer in a negative direction, and a third state in which no current flows in said transformer.

5. An apparatus according to claim 4, further comprising:

a first differential input buffer having a positive or negative signal input terminal and a reference signal input terminal, the positive or negative signal input terminal being connected to one of the first and second signal lines on a secondary side of said transformer;

a second differential input buffer having a positive or negative signal input terminal and a reference signal input terminal, the positive or negative signal input terminal being connected to the other of the first and second signal lines on the secondary side of said transformer; and means for detecting a value of the ternary data transmitted through the first and second signal lines on the basis of a combination of output signals from said first and second differential input buffers, and converting the value into binary data constituting serial data.

6. An apparatus according to claim 5, further comprising means for applying a predetermined bias voltage between the reference signal input terminals of said first and second differential input buffers and the first and second signal lines on the secondary side of said transformer so as to produce potential differences between the reference signal input terminals and the first and second signal lines on the secondary side of said transformer in the third state.

7. An electronic apparatus comprising:

a first differential output buffer whose positive and negative output terminals are respectively connected to first and second signal lines;

a second differential output buffer whose positive and negative output terminals are respectively connected the first and second signal lines; and means for driving said first and second differential output buffers in response to input binary serial data to set a first state in which a current flows through the first signal line in a first direction, and a current flows through the second signal line in a second direction, a second state in which a current flows through the first signal line in the second direction, and a current flows through the second signal line in the first direction, or a third state in which no current flows through the first and second signal lines.

8. An apparatus according to claim 7, wherein said driving means drives said first and second differential output buffers to set the first state when input serial data has a first value and last input serial data had a second value, the second state when the input serial data has the second value and the last input serial data had the first value, and the third state when the input serial data is identical to the last input serial data.

9. An apparatus according to claim 7, further comprising conversion means connected to said driving means for converting parallel data into binary serial data.

10. An apparatus according to claim 9, further comprising bus interface means connected to said conversion means.

11. An apparatus according to claim 7, further comprising:

a first differential input buffer having a positive signal input terminal, a reference signal input terminal, and an output terminal;

a second differential input buffer having a negative signal input terminal, a reference signal input terminal, and an output terminal; and means for generating binary serial data in response to outputs from said first and second differential input buffers.

12. An apparatus according to claim 11, further comprising a transformer whose first and second terminals on a secondary side are respectively connected to said positive signal input terminal of said first differential input buffer and said negative signal input terminal of said second differential input buffer.

13. An apparatus according to claim 12, further comprising means for applying a predetermined bias voltage between the reference signal input terminals of said first and second differential input buffers and the first and second terminals on the secondary side of said transformer to produce potential differences between the reference signal input terminals and the first and second terminals on the secondary side of said transformer when no current flows on a primary side of said transformer.

14. An apparatus according to claim 12, wherein said transformer is a pulse transformer.

15. An electronic apparatus comprising:

a first differential input buffer having a positive signal input terminal, a reference signal input terminal, and an output terminal;

a second differential input buffer having a negative signal input terminal, a reference signal input terminal, and an output terminal;

means for generating binary serial data in response to outputs from said first and second differential input buffers; and a transformer whose first and second terminals on a secondary side are respectively connected to said positive signal input terminal of said first differential input buffer and said negative signal input terminal of said second differential input buffer.

16. An apparatus according to claim 15, further comprising means for applying a predetermined bias voltage between the reference signal input terminals of said first and second differential input buffers and the first and second terminals on the secondary side of said transformer so as to produce potential differences between the reference signal input terminals and the first and second terminals on the secondary side of said transformer when no current flows on a primary side of said transformer.

17. An apparatus according to claim 15, wherein said transformer is a pulse transformer.

18. An electronic apparatus comprising:

a terminal receiving binary serial data;

means for encoding said binary serial data into ternary data; and means for outputting said encoded ternary data, wherein the outputting means have a first and a second output terminals to output the ternary data with at least three states including a first state in which a voltage of the first output terminal is higher than a voltage of the second output terminal, a second state in which a voltage of the second output terminal is higher than a voltage of the first output terminal, and a third state in which a voltage of the first output terminal and a voltage of the second output terminal are approximately same.

19. An electronic apparatus comprising:

a binary data source;

transformer whose first and second terminals on a primary side are respectively connected to first and second lines;

a terminal receiving binary serial data from said binary data source;

means for encoding said binary serial data into ternary data;

first means for outputting said encoded ternary data through the first and second signal lines to said transformer;

means for receiving said ternary data from said transformer;

means for decoding said ternary data into said binary data; and second means for outputting said decoded binary data, wherein said first outputting means outputs said ternary data with at least three states including a first state in which a current flows in said transformer in a negative direction, and a third state in which a current flow in said transformer is prevented.

* * * * *